US 6,915,985 B2
Jul. 12, 2005

(12) United States Patent
Arias

(54) ANTI-HIJACKING SYSTEM

(76) Inventor: Anthony R. Arias, 4302 Cottington Rd., Baltimore, MD (US) 21236

(*) Notice: Subject to any disclaimer, the term of this patent is extended or adjusted under 35 U.S.C. 154(b) by 356 days.

(21) Appl. No.: 09/965,832

(22) Filed: Oct. 1, 2001

(65) Prior Publication Data

US 2003/0062446 A1 Apr. 3, 2003

(51) Int. Cl.$^7$ .............................................. B64D 13/00
(52) U.S. Cl. ................................... 244/118.5; 244/1 R
(58) Field of Search .......................... 109/29, 20, 32; 244/118.5, 122 R, 1 R, 119

(56) References Cited

U.S. PATENT DOCUMENTS

| | | | | |
|---|---|---|---|---|
| 3,680,499 A | * | 8/1972 | Boudreau | 109/32 |
| 3,704,845 A | * | 12/1972 | Ord | 244/1 R |
| 3,841,328 A | * | 10/1974 | Jensen | 244/1 R |
| 4,060,039 A | * | 11/1977 | Lagarrigue | 109/3 |
| 4,121,523 A | * | 10/1978 | Hastings | 109/11 |
| 5,195,448 A | * | 3/1993 | Sims | 109/31 |
| 5,280,268 A | * | 1/1994 | Matthews | 307/10.2 |
| 5,298,878 A | * | 3/1994 | Smith | 307/10.2 |
| 5,745,030 A | * | 4/1998 | Aaron | 280/287 |
| 5,825,283 A | * | 10/1998 | Camhi | 340/438 |
| 5,912,615 A | * | 6/1999 | Kretzmar et al. | 180/287 |

FOREIGN PATENT DOCUMENTS

| | | | | |
|---|---|---|---|---|
| DE | 3507593 A1 | * | 9/1986 | B60R/25/00 |
| DE | 4133110 A1 | * | 4/1993 | G08B/15/02 |

\* cited by examiner

*Primary Examiner*—Charles T. Jordan
*Assistant Examiner*—Tim D. Collins
(74) *Attorney, Agent, or Firm*—Alfred F. Hoyte

(57) ABSTRACT

A hijacking prevention system which employs a gas which can render everyone in the passenger compartment temporarily unconscious in the event a hijacking occurs. A single switch, hidden in the cockpit and easily accessible to the pilot while flying the plane, would activate the flow of the gas through the existing venting system, while simultaneously locking and/or sealing the cockpit door, and deploying air masks connected to a separate source of fresh air for the pilots. Each of the crew members, and a selected one of the passengers, e.g., an air Marshall or security agent, would be equipped with a transmitter alerting the pilots to the need of deploying the system.

2 Claims, 2 Drawing Sheets

ANTI-HIJACKING SYSTEM

BACKGROUND OF THE INVENTION

The present invention relates to the field of aviation. More particularly, it relates to an airplane safety system which can incapacitate passengers and simultaneously isolate pilots from the passengers in the event of a hijacking attempt.

STATEMENT OF THE PRIOR ART

In the wake of the relatively recent phenomena of airplane hijacking, many devices and systems have been designed to prevent or discourage hijacks. Most of these systems are design to identify potential hijackers before they actually attempt to hijack a plane. These system and methods include metal detectors, bomb sniffing dogs, educating security personnel of typical hijacker profiles, etc. These systems have resulted in an overall reduction in the number of hijackings. In response to these systems however, hijackers have become ever more persistent and devious in the methods they have used to control the aircraft. Accordingly, hijacking continue to occur, and represent an even greater danger to public safety than ever before.

Acknowledging that no system or device is 100 percent foolproof, systems and devices for thwarting hijackers after they have attempted to gain control of the aircraft have been proposed, but have been met with only moderate success. The simplest device is a reinforced cockpit door having a sturdy locking mechanism. While this simplistic approach may prevent the would be hijackers from accessing the cockpit, it does nothing to prevent the hijackers from harming passengers and crew. Also, even the sturdiest cockpit door would eventually giveaway to repeated attempts at forcible entry. While some systems have been invented to deal with the problem of would be hijackers and the threat imposed upon the passengers and crew of a distressed aircraft, none of these systems have been deemed practical enough for deployment on commercial aircraft.

U.S. Pat. No. 3,704,845 issued to Ord discloses an airplane hijacking prevention system where would be hijackers are prevented access to the cockpit by way of a one way cockpit door. The door, which is made of bulletproof, fire resistant material, can only be opened from the interior of the cockpit. A communication system allows communication only from the cockpit to the cabin and not in the reverse direction so that the pilots cannot be verbally coerced into allowing the hijackers access to the cockpit. This system suffers from the drawbacks discussed above, i.e., there is no way to control the hijackers who are otherwise free to bring about extreme harm to the passengers and crew, not to mention.

U.S. Pat. No. 3,841,328 issued to Jensen discloses a hijacking prevention system where one or more hijackers is incapacitated by a remotely operated hypodermic needle which can protrude through the seat to inject a toxin into the hijacker. This device suffers from the obvious drawback that the hijacker must be seated when the device is employed. Also, every seat in the passenger cabin would have to be equipped with such a device. Finally, the accidental triggering of the device could bring about catastrophic results, including death, if an elderly or medicated passenger is injected.

None of the above inventions and patents, taken either singly or in combination, is seen to describe the instant invention as claimed.

SUMMARY OF THE INVENTION

The present invention overcomes the disadvantages of the prior art by providing a hijacking prevention system which employs a gas which can render everyone in the passenger compartment temporarily unconscious in the event a hijacking occurs. A single switch, hidden in the cockpit and easily accessible to the pilot while flying the plane, would activate the flow of the gas through the existing venting system, while simultaneously locking and/or sealing the cockpit door, and deploying air masks connected to a separate source of fresh air for the pilots. Each of the crew members, and a selected one of the passengers, e.g., an air Marshall or security agent, would be equipped with a transmitter alerting the pilots to the need of deploying the system.

Accordingly, it is a principal object of the invention to provide a new and improved hijacking prevention system for aircraft.

Accordingly, it is an object of the invention to provide a new and improved hijacking prevention system for aircraft which has means for incapacitating the passengers.

It is another object of the invention to provide a new and improved hijacking prevention system for aircraft which has means for initiating several anti-hijacking measures simultaneously.

It is another object of the invention to provide a new and improved hijacking prevention system for aircraft where an incapacitating gas is automatically caused to circulate through the passenger compartment.

It is another object of the invention to provide a new and improved hijacking prevention system for aircraft where the pilots and navigator are supplied with air masks connected to a separate source of fresh air to prevent cross contamination with the main air supply system for the aircraft.

It is another object of the invention to provide a new and improved hijacking prevention system for aircraft where the cockpit door is automatically locked when the system is activated.

It is another object of the invention to provide a new and improved hijacking prevention system for aircraft where the cockpit door is automatically sealed and verified upon activation.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
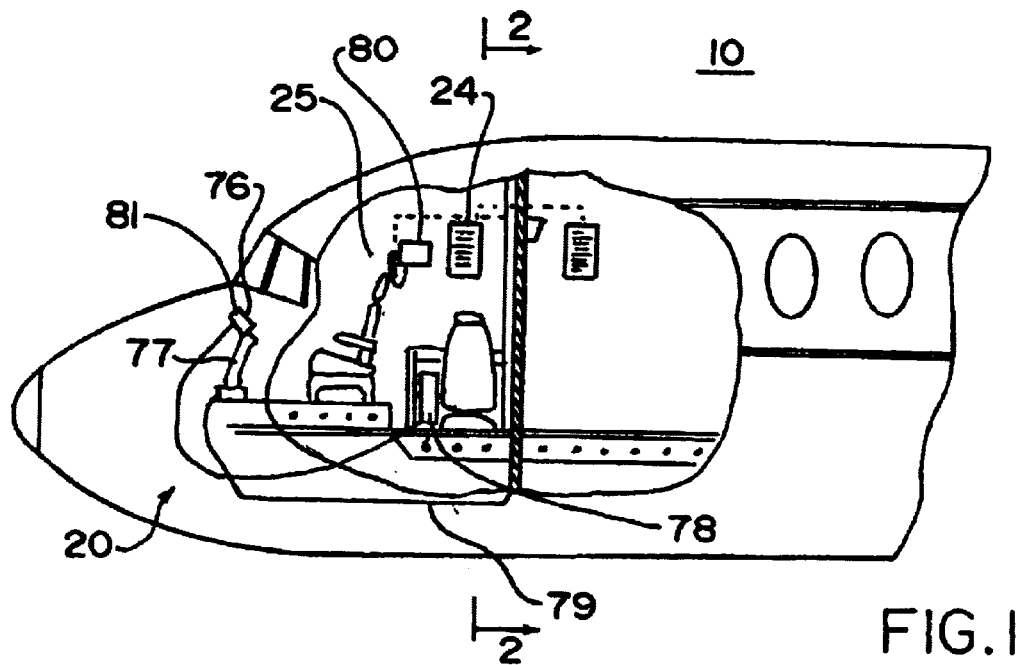
FIG. 1 shows a partially broken away side view of an aircraft employing the anti-hijacking system of the present invention.
Figure 2:
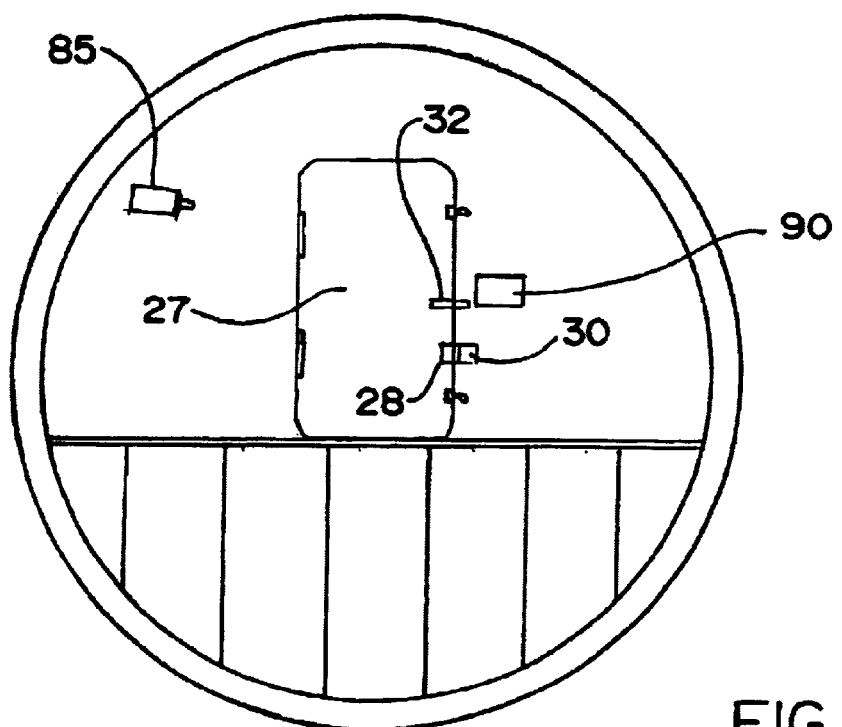
FIG. 2 shows a cross-section of an aircraft fuselage illustrating the cockpit door.
Figure 3:
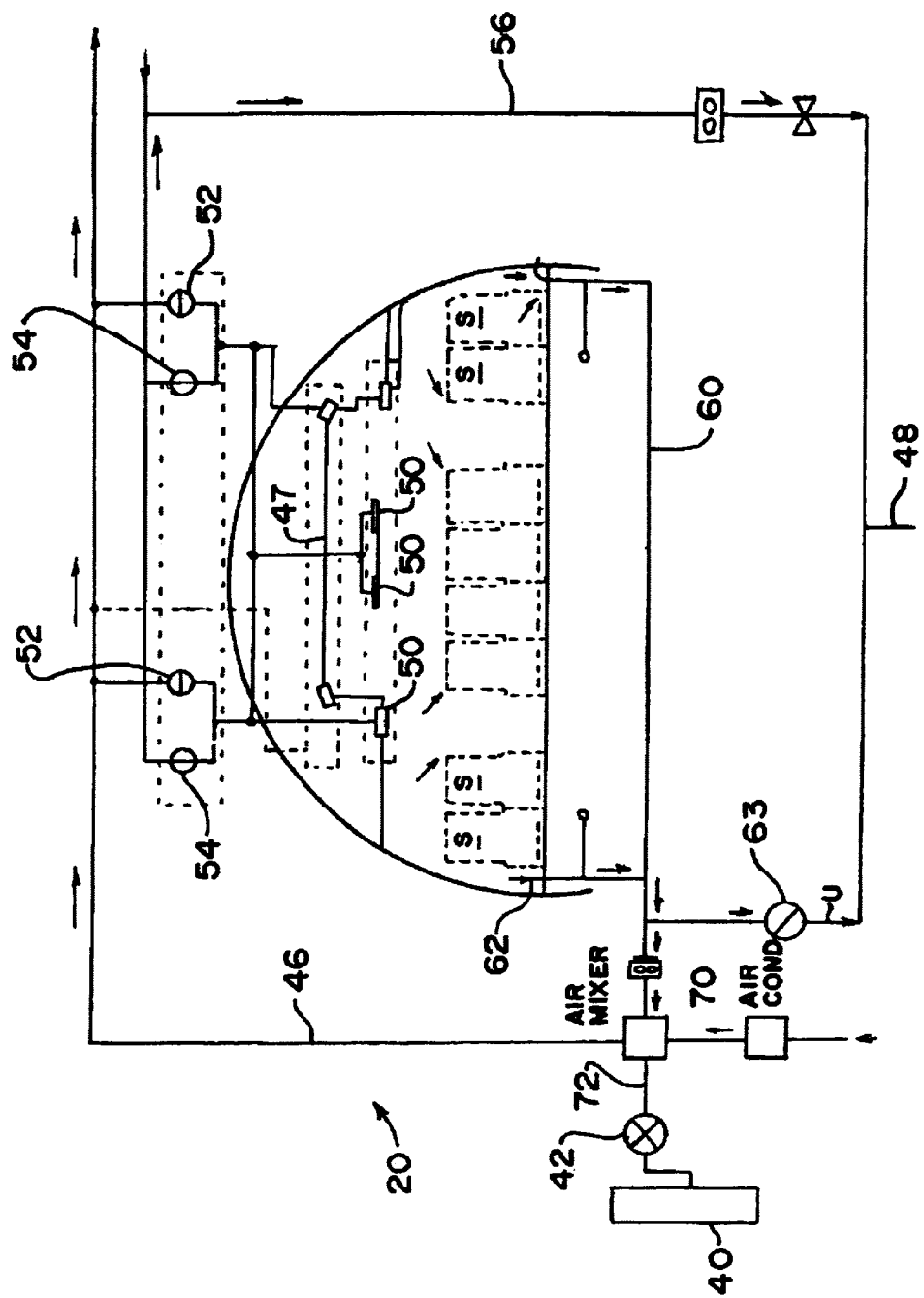
FIG. 3 shows a cross-section of an aircraft fuselage illustrating the ventilation system of an aircraft employing the passenger incapacitating means of the present invention.

Referring now to FIGS. 1–3, the anti-hijacking system of the present invention, generally indicated by the numeral 10, is shown.

The system has two primary subsystems; an automatic cockpit door locking system 20, and a gas dispersion system 22. Each of the systems are controlled by a common control unit 24 which is mounted within an interior wall of the cockpit 25. The automatic cockpit door locking system 20 is operated by a switch 26, preferably floor mounted in a discrete location which varies slightly from aircraft to aircraft, which also initiates the gas dispersion system 22. The cockpit door 27 is preferably a reinforced metal door having a door handle 28 and associated latch 30, which are conventional, on either side of the door 27. In a preferred embodiment, door handle 28 and associated latch 30 cannot be operated from outside the cockpit without a key. Of course other means to allow selective access to the cockpit through the cockpit door 27 via handle 28 and latch 30 may be used such as a combination or code, which would require additional components not shown here. In addition to latch 30, an electrically powered locking bolt 32, movable in response to operation of switch 26 as will be described in more detail later, is provided. This bolt 32 is normally in the open or unlocked position, and serves, when the system 10 is activated, to prevent entry into the cockpit by the crew even if they have the key or code required to operate latch 30.

The gas dispersion system 22 can be integrated into the existing ventilation system for the aircraft. A quantity of gas can be stored in a standard gas tank 40 having an outlet connected to a conduit in fluid communication with an electrically operated valve 42, the valve 42 serving to selectively dispense gas into the conduits of the main ventilation system as will be explained in more detail later. The gas used to incapacitate the passengers may be any of several well known types of gases used, e.g., to anesthesize patients, and would be selected to be of minimum risk to passengers who may be medicated, elderly etc. In accordance with one aspect of the invention, each passenger would sign a waiver. Also, a separate, locked compartment may be provided for the extreme elderly and infants. This compartment may be boarded first and would have to be locked for the entire duration of the flight regardless of the circumstances. In accordance with another aspect of the invention, passengers may be searched for gas masks or other devices which could be used to defeat the system 10.

The ventilation system includes a main inlet conduit 46 and a main outlet conduit 48. Each row of seats S is connected to a common horizontally extending conduit 47, and at least every pair of seats is proximate a vent 50 allowing air to flow to passengers occupying those seats. Typically, these vents 50 can be opened or closed by passengers. However, in accordance with a key feature of the invention, closure of the vents cannot be accomplished by the passengers. However, electrically powered valves 52, not within reach of the passengers, can be used to limit airflow to a selected seat or group of seats. Control of these valves 52 may be carried by the pilots via a keypad (not shown) connected to module 24. Thus the module 24 could track the position of the valves 52. These valves 52 would be open in the event the system 10 is activated so that flow of the gas would be uninhibited. Valves 54 allow for depressurization of the cabin by allowing air to be drawn out via outlet conduit 56 as is well known. Air is re-circulated via conduit 60 which is in fluid communication with floor vents 62. Conduit 60 is connected to an exhaust conduit via valve 63, as well as a filter 64 and converges at air mixer 66 along with the air conditioner output conduit 70, and the conduit 72 connected to valve 42.

A source of outside air not connected with any of the above mentioned conduits can supply air to the cockpit 25 via vent 76 when the system 10 is activated. Outside air may be drawn into and through conduit 77 via fan, conduit, an exterior vent arrangement (not shown) as is well known in the art. Additionally, a separate oxygen tank 78 is provided, the tank connected via conduit 79 to an air mask 81.

Preferably, one or more cameras 85 are provided which can scan the cabin 78, with a monitor 80 contained in the cockpit for viewing by the pilots.

In operation, when switch 26 is depressed, bolt 32 is slid into the locked position by a bolt operating mechanism 90 controlled by control module 24 to prevent access to the cockpit 25 even by the crew having the appropriate key or code. Simultaneously, valve 42 is opened to allow the flow of gas from tank 40, which may be helped by a fan (not shown) to speed airflow into conduit 46. The door 27 may include a sealing mechanism (not shown) which is initiated by depression of switch 26. Air masks 80 are deployed, supplying either fresh air or air from tank 78 to the pilots. Valves 52 are forced open regardless of their position at the time of deployment of the system 10, and valves 54 are closed unless they must be open to maintain proper pressurization. Cameras 85 go into the scan mode, allowing the pilots to visually gauge the effectiveness pf the system.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. An anti-hijacking system installed in an aircraft having a cockpit, a passenger compartment, and a cockpit door separating the passenger compartment from said cockpit, comprising:

a cockpit door locking system having means for locking the cockpit door;

a ventilation system, and means interfaced with said ventilation system for dispersing an incapacitating gas;

a source of air separate from said ventilation system, and means for delivering air from said source to said cockpit; and, control means for controlling both said ventilation system and said locking system, said control means capable of simultaneously operating said ventilation system and said locking system in response to a single control signal.

2. The system of claim 1 wherein said means includes masks accessible by occupants of said cockpit.

* * * * *